Patented July 25, 1933

1,919,825

UNITED STATES PATENT OFFICE

ROBERT E. BURK, OF CLEVELAND, OHIO, ASSIGNOR TO THE STANDARD OIL COMPANY, OF CLEVELAND, OHIO, A CORPORATION OF OHIO

TREATING CRACKED DISTILLATES

No Drawing.   Application filed August 28, 1929. Serial No. 389,083.

Cracked petroleum distillates, as produced by pyrogenetic decomposition processes, exhibit a tendency to develop more or less gum formation, manifest on vaporation, and occasionally tending to give trouble in internal combustion engines using such material for fuel; a gummy deposit forming in the intake manifold, and on the valves or valve stems. In certain instances, the gum forming tendency is found to be accentuated also on prolonged storage. A treatment for such a condition effective and yet not unduly complicating manufacturing procedure and costs is of fundamental importance and highly desirable.

To the accomplishment of the foregoing and related ends, the invention, then, consists of the features hereinafter fully described, and particularly pointed out in the claims, the following description setting forth in detail certain embodiments of the invention, these being illustrative however of but a few of the various ways in which the principle of the invention may be employed.

In its general aspects, the invention contemplates treating cracked petroleum distillates by generating a gum-inhibiting agent therein. Such inhibiting agent may preferably be on the order of an organic nitrogen compound, the petroleum being treated to generate the compound in situ, by aminizing treatment.

There may be incorporated in the distillate, a halogenated alkyl compound, by direct reaction therein, or by addition, and an aminizing compound may then be brought into reaction therewith. One convenient procedure may involve the treatment of a lye washed cracked distillate by admixing a halogenated alkyl compound, and subjecting to the action of ammonia. Brom-hydrocarbons, chlor-hydrocarbons and still less desirably iodo-hydrocarbons may be employed; particularly advantageously ethylene bromide. With ethylene bromide, the brom-compound is added to the lye washed distillate at the rate of about 0.1 pound per 42-gallon barrel. Ammonia is incorporated, preferably in gaseous form, and the amount may be proportioned to the ethylene bromide in at least molecular ratio, as 2 mols of $NH_3$ to 1 mol of $C_2H_4Br_2$. Desirably, the distillate is heated to a temperature over 200° F., and preferably around 320° F. In practice, this may be provided by passing the material through a heating coil, the ethylene bromide and the ammonia being fed into the distillate by proportional feed means. From the heating coil, the mixture may proceed to a reaction chamber or drum where the temperature is maintained for from about five minutes to about one hour. The ammonia reacts with the halogen compound additively. On treatment now with further alkaline agent, the halogen is removed, leaving an amine compound; in the case of ethylene bromide the resultant amine is ethylene diamine. The alkali may be supplied by adding an excess of ammonia, in which case the halogen forms for instance ammonium bromide. Or, the mixture may be treated with lime, for instance by passing through a lime filter, and the halogen then combines with the calcium of the lime, forming in the case stated calcium bromide and ethylene diamine. Other minor reactions can also occur, for instance ethylene diamine may react with ethylene bromide with formation of closed chain compounds and with further ammonia or other alkaline reagent result in such compounds as piperazine. Similarly other higher polyamines may be formed in the process, as diethylene triamine, etc., as needs not be further detailed.

Preferably instead of resorting to pure alkyl halogen compounds, as for instance ethylene bromide, to be added as such to the cracked distillate, I may halogenate petroleum hydrocarbons soluble in the distillate, and aminize. The tail-gases from the cracking plant may be halogenated and the products returned to the distillate, and ammonia be supplied, and with a suitably raised temperature, for instance 200–550° F., or in some cases as high as around 825° F., the reaction may be carried out; or the distillate material may itself be directly chlorinated or brominated, further alkalization, either with an excess of ammonia or with lime or other equivalent as may be preferred, may then complete the amine formation. Or again, the brominated or chlorinated cracked distillate, or cracked distillate containing alkyl halides, such as ethylene dibromide introduced in any way whatever may be treated with sodamide, no other reagent then being necessary, as for example, passing the warm distillate containing the halide through a mass of solid sodamide. The following reaction takes place:—

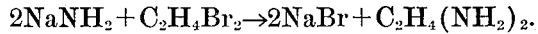

Where a finished anti-knock gasoline already containing a halogenated hydrocarbon is to be treated, it is then merely necessary to aminize in any of the ways desired.

Since the amount of gum-inhibiting agent required is relatively small, it will be seen that such treatment, either incorporating a halogenated alkyl and aminizing, or halogenating hydrocarbons already available with the petroleum, and aminizing, have the particular advantage of providing the agent directly in situ in the distillate, and in a manner consistent with desirable plant procedure generally. It is also possible that this treatment converts aldehydes into amines and mercaptans into thio-ethers. Both aldehydes and mercaptans are objectionable from the gum-standpoint.

Other modes of applying the principle of the invention may be employed, change being made as regards the details disclosed, provided the features stated in any of the following claims, or the equivalent of such, be employed.

I therefore particularly point out and distinctly claim as my invention:—

1. A process of improving cracked petroleum distillates, which comprises aminizing components of such distillate material, thereby attaining a fuel stable against gum-formation.

2. A process of improving cracked petroleum distillates, which comprises treating such distillate with a halogenated hydrocarbon compound and aminizing such compound, thereby attaining a fuel stable against gum-formation.

3. A process of improving cracked petroleum distillates, which comprises halogenating petroleum hydrocarbons, incorporating such in the distillate, and converting the halogenated compounds into amino compounds, thereby attaining a fuel stable against gum-formation.

4. A process of improving cracked petroleum distillates, which comprises halogenating the distillate material, and aminizing, thereby attaining a fuel stable against gum-formation.

5. A process of improving cracked petroleum distillates, which comprises halogenating petroleum hydrocarbon gas and incorporating the product in the cracked distillate, and aminizing the halogenated compound.

6. A process of improving cracked petroleum distillates, which comprises halogenating petroleum tail-gas, incorporating the product in the cracked distillate, and aminizing the halogenated compound.

7. A process of improving cracked petroleum distillates, which comprises treating such distillate with a brominated hydrocarbon compound and aminizing the brominated compound, thereby attaining a fuel stable against gum-formation.

8. A process of improving cracked petroleum distillates, which comprises treating such distillate with a brominated hydrocarbon compound and aminizing the brominated compound with ammonia, thereby attaining a fuel stable against gum-formation.

9. A process of improving cracked petroleum distillates, which comprises treating such distillate with ethylene bromide and aminizing the bromide, thereby attaining a fuel stable against gum-formation.

10. A process of improving cracked petroleum distillates, which comprises brominating hydrocarbons, incorporating such in the distillate, and aminizing the brominated hydrocarbons, thereby attaining a fuel stable against gum-formation.

11. A process of improving cracked petroleum distillates, which comprises brominating petroleum hydrocarbon gas, incorporating the product in the cracked distillate, and aminizing the brominated compound with ammonia.

12. A process of improving cracked petroleum distillates, which comprises brominating petroleum tail-gas, incorporating the product in the cracked distillate, and aminizing the brominated compound.

13. A process of improving cracked petroleum distillates, which comprises providing such distillate with a halogenated alkyl compound aminizing the halogenated compound, and further subjecting to an alkaline agent, thereby attaining a fuel stable against gum-formation.

14. A process of improving cracked petroleum distillates, which comprises providing such distillate with a halogenated alkyl compound aminizing the halogenated compound, and further subjecting to lime, thereby attaining a fuel stable against gum-formation.

15. A process of improving cracked petroleum distillates, which comprises halogenating petroleum hydrocarbon, incorporating such in the distillate, aminizing the halogenated compound with ammonia, and further subjecting to the action of lime.

16. A process of improving cracked petroleum distillates, comprising halogenating petroleum hydrocarbon gas, incorporating the product in the cracked distillate, aminizing the halogenated compound ammonia, and further subjecting to the action of lime.

17. A process of improving cracked petroleum distillates, which comprises bromi- nating petroleum tail-gas, incorporating the product in the cracked distillate, aminizing the brominated compound with ammonia, and further subjecting to the action of lime.

ROBERT E. BURK.